Nov. 22, 1949 N. BISHOP 2,489,075
PULSE ECHO TESTING APPARATUS
Filed April 17, 1943
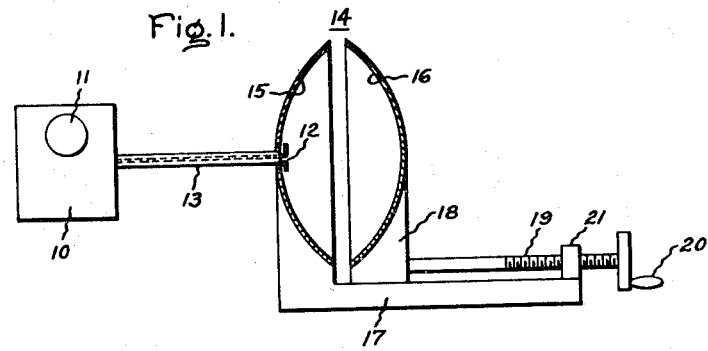
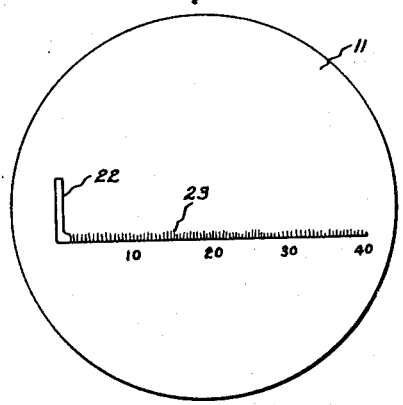
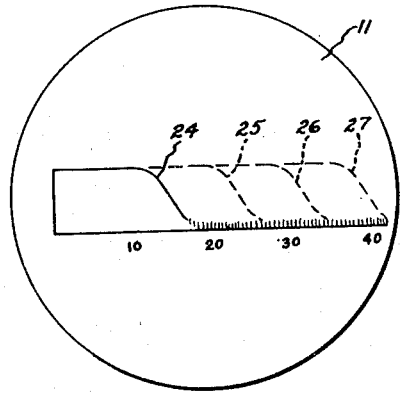
Inventor:
Nathaniel Bishop,
by Harry E. Dunham
His Attorney.

Patented Nov. 22, 1949

2,489,075

UNITED STATES PATENT OFFICE 2,489,075

PULSE ECHO TESTING APPARATUS

Nathaniel Bishop, Fairfield, Conn., assignor to General Electric Company, a corporation of New York Application April 17, 1943, Serial No. 483,447

5 Claims. (Cl. 343—5)

1

This invention relates to pulse systems and more particularly to means for testing echo apparatus.

Pulse systems have been proposed in which periodic pulses of short wave oscillations are radiated into space and an echo of each pulse is received in the period prior to the next succeeding pulse. Means operating during the time between the radiated pulses of high frequency oscillations and the receipt of echo pulses is provided for indicating the distance from the source of echo to the receiver.

It is desirable that manufacturers of such apparatus have means for testing the performance, including both the transmitter power output and the receiver sensitivity. One possible method is to aim the antenna of the apparatus at a distant fixed known target and to estimate the performance by comparing the resulting signal-to-noise ratio with that produced by a standard unit of accepted performance. This method is not entirely reliable because of variations of transmission loss with changes of atmospheric conditions, etc. Such unreliability is especially true at high frequencies.

It is, therefore, an object of my invention to provide means for testing echo apparatus which is reliable, simple in construction and operation, inexpensive, and of minimum bulk.

In carrying out the above objects I have provided a reverberation device which when energized by a signal from a transmitter coupled to the device, creates continued artificial echoes or reverberations of sufficient intensity to saturate the receiver associated with the transmitter. The duration of the reverberations or, in other words, the length of time during which saturation continues, is a measure of the overall performance of the equipment.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 is a side elevational sectional view of apparatus embodying the principles of my invention and Figs. 2 and 3 illustrate possible visual indications which may be viewed in the receiving apparatus illustrated in Fig. 1.

Referring to Fig. 1, there is represented by the numeral 10 echo apparatus which may include means for transmitting pulses, including means

2 for generating pulses of high radio frequency oscillations or carrier wave, means for receiving echoes, and means, such as a cathode ray device having a viewing screen 11, for indicating in normal operation of the radio system, the distance to the reflected surface and for indicating, during testing of the radio system, the duration of the reverberations. The pulses of high radio frequency oscillations produced by the echo apparatus are supplied to a suitable antenna 12, such as a center fed dipole, by means of a suitable transmission line 13 illustrated as comprising a coaxial cable.

There is provided a reverberation device 14 comprising a pair of opposing coaxial reflectors 15 and 16 suitably supported on the base or stand 17, the reflectors preferably being parabolic in shape. The antenna 12 is preferably located at the focal point of either of the reflectors 15 or 16 for exciting the reverberation device.

With such an arrangement pulses emitted or radiated from the antenna 12 are reflected from the surfaces of the reflectors. Some of the reflected energy is intercepted by the antenna 12 and as long as reverberation continues, the antenna continues to intercept energy and an indication is given on the viewing screen 11. The indication thus obtained may be compared with the indication given by a standard unit of accepted performance.

In Figs. 2 and 3 there are depicted possible indications which may take place on the viewing screen 11. In Fig. 2 is shown an indication in the form of a pulse 22 with which the antenna 12 is energized during transmission in actual operation without the reverberation device and with no reflection. The irregular line 23 represents the noise level. In Fig. 3 there is indicated the type of indication occurring when the test apparatus is used. A continued reverberation is indicated by the solid line designated by the numeral 24. The range at which the reverberation signal drops into the noise level as viewed in the screen is a measure of the performance of the unit being tested. The dotted lines 25, 26 and 27 indicate better system performance than is indicated by the numeral 24 and hence a greater useful range of the unit being tested.

Means is provided for tuning the reverberation device 14. It has been found that the reverberation device resonates at several spacings. It has also been found that the spacing between the reflectors affects the duration of the reverberation or, in other words, maximum fill, as indicated by the numeral 27 in Fig. 3, is obtained by the minimum spacing of the reflectors which gives resonance at the frequency of operation of the unit being tested. Therefore, means is provided for adjusting the spacing of the reflectors.

The adjusting means illustrated in Fig. 1 comprises a member 18 reciprocably or slidably carried by the base 17, the reflector 16 being suitably carried by the member 18. A suitable operating device, such as a crank 20 having attached thereto a partially threaded rod 19, is provided. The threaded part of the rod or member 19 passes through a suitably tapped opening in a bracket 21 which is suitably secured to the device 17. Obviously, turning of the operating member 20 causes the reflector 16 to move closer to or further away from the reflector 15 depending upon the direction of rotation of the operating member.

As is well known, an electrical device is said to have a high Q or a low Q depending upon the ratio of inductance to resistance of the device. I have found that the Q of the reverbration device described herein and illustrated in the drawing may be varied by changing the spacing between the reflectors. I have also found that the maximum Q for a given reverberation device of the above type is obtained with a minimum spacing. The Q decreases as the reflectors are moved apart because of greater radiation loss. The reflectors, if desired, may be enclosed in a shielding cylinder in order to minimize radiation losses. Such an arrangement enables maintenance of a higher Q and reverberation at a greater spacing than is otherwise possible.

If a reverberation or echo device having a high Q, such as described and illustrated herein, is tightly coupled to the transmitter being tested, operation of the transmitter oscillator is adversely affected. On the other hand, a low Q device is not desirable because the reverberation decays in too short a time. Hence I prefer to employ a high Q device and a transmission line 13 in conjunction therewith having sufficient loss to present a load on the equipment 10 which is largely resistive thereby simulating substantially normal operating conditions.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A reverberation device comprising two closely spaced oppositely directed coaxial substantially parabolic reflectors of substantially the same size, means at substantially the focal point of one of said reflectors for exciting said device with electromagnetic wave pulses, and means to vary the spacing between said reflectors to tune said device to the frequency of the waves comprising said pulses thereby to vary the period of reverberation after each pulse.

2. A reverberation device comprising two opposing coaxial substantially parabolic reflectors, means disposed at substantially the focal point of one of said reflectors for exciting said device, means supplying pulses of wave energy to said means, and means for measuring the duration of the reverberations following each of said pulses.

3. A reverberation device comprising two opposing coaxial substantially parabolic reflectors, means for moving one of said reflectors along the axis of said reflectors, means at substantially the focal point of one of said reflectors for exciting said device, and means connected to said exciting means for measuring the reverberation.

4. A reverberation device comprising two opposing reflectors, means for varying the spacing between said reflectors, means disposed between the reflectors for exciting said device with pulses of radio frequency oscillations, and means for measuring the duration of the reverberation following each of said pulses.

5. Test apparatus for locating equipment having a pulse transmitter and an echo pulse receiver including means for indicating the time of arrival of the echo pulses relative to the transmitted pulses, comprising a reverberate reflector system coupling said receiver to said transmitter and arranged for excitation by the transmitted pulses, whereby the duration of the reverberation is a measure of the performance of the equipment, said reverberate system comprising a pair of oppositely directed coaxial parabolic reflectors of substantially the same size and so spaced that the duration of the reverberation is long compared to the duration of the pulses.

NATHANIEL BISHOP.

REFERENCES CITED

The following references are of record in the file of this patent:

UNITED STATES PATENTS

| Number | Name | Date |
| --- | --- | --- |
| 1,331,098 | Finch | Feb. 17, 1920 |
| 1,384,014 | Fessenden | July 5, 1921 |
| 2,051,537 | Wolff et al. | Aug. 18, 1936 |
| 2,118,419 | Scharlau | May 24, 1938 |
| 2,208,422 | Hugon | July 16, 1940 |
| 2,227,598 | Lyman et al. | Jan. 7, 1941 |
| 2,232,559 | Rice | Feb. 18, 1941 |
| 2,460,827 | Isely | Feb. 8, 1949 |